(12) United States Patent
Shimizu et al.

(10) Patent No.: US 11,319,012 B2
(45) Date of Patent: May 3, 2022

(54) SADDLE-RIDING TYPE VEHICLE

(71) Applicant: HONDA MOTOR CO., LTD., Tokyo (JP)

(72) Inventors: Takahiko Shimizu, Wako (JP); Tsubasa Ishii, Wako (JP); Nobuyuki Shimomura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 168 days.

(21) Appl. No.: 16/489,525

(22) PCT Filed: Jan. 29, 2018

(86) PCT No.: PCT/JP2018/002650
§ 371 (c)(1),
(2) Date: Aug. 28, 2019

(87) PCT Pub. No.: WO2018/168223
PCT Pub. Date: Sep. 20, 2018

(65) Prior Publication Data
US 2019/0375475 A1     Dec. 12, 2019

(30) Foreign Application Priority Data
Mar. 13, 2017   (JP) .............................. JP2017-047292

(51) Int. Cl.
*B62J 35/00*     (2006.01)
*B62J 37/00*     (2006.01)
(Continued)

(52) U.S. Cl.
CPC .............. *B62J 35/00* (2013.01); *B62J 37/00* (2013.01); *B62J 17/00* (2013.01); *B62J 25/04* (2020.02); *B62K 11/04* (2013.01); *B62K 19/32* (2013.01)

(58) Field of Classification Search
CPC . B62J 37/00; B62J 35/00; B62J 25/00; B62K 11/04
See application file for complete search history.

(56) References Cited

U.S. PATENT DOCUMENTS

| | | | |
|---|---|---|---|
| 7,562,734 B2 * | 7/2009 | Yano ...................... | B62K 19/46 180/219 |
| 7,762,367 B2 * | 7/2010 | Yamaguchi ............ | B62K 11/04 180/68.1 |

(Continued)

FOREIGN PATENT DOCUMENTS

| | | |
|---|---|---|
| CN | 1195626 A | 10/1998 |
| CN | 103010354 A | 4/2013 |

(Continued)

OTHER PUBLICATIONS

International Search Report, issued in PCT/JP2018/002650, dated Apr. 10, 2018.

(Continued)

*Primary Examiner* — Minnah L Seoh
*Assistant Examiner* — Michael R Stabley
(74) *Attorney, Agent, or Firm* — Birch, Stewart, Kolasch & Birch, LLP

(57) ABSTRACT

A saddle-riding type vehicle is provided in which a water-cooled internal combustion engine, a radiator and a fuel tank are supported on a vehicle body frame. A canister that collects fuel vaporized within the fuel tank is disposed in front of the radiator in a vehicle fore-and-aft direction when viewed from a side. This can enhance the effect in cooling the canister.

6 Claims, 5 Drawing Sheets

(51) Int. Cl.
*B62K 11/04* (2006.01)
*B62K 19/32* (2006.01)
*B62J 17/00* (2020.01)
*B62J 25/04* (2020.01)

(56) References Cited

U.S. PATENT DOCUMENTS

| | | | | |
|---|---|---|---|---|
| 8,141,670 | B2* | 3/2012 | Hayashi | B62K 19/30 |
| | | | | 180/68.6 |
| 8,327,964 | B2* | 12/2012 | Inaoka | B62J 37/00 |
| | | | | 180/219 |
| 8,448,737 | B2* | 5/2013 | Hasegawa | B62J 35/00 |
| | | | | 180/219 |
| 8,776,923 | B2* | 7/2014 | Nakamura | B62J 35/00 |
| | | | | 180/68.1 |
| 8,857,553 | B2* | 10/2014 | Nakamura | B62K 11/00 |
| | | | | 180/229 |
| 8,950,799 | B2* | 2/2015 | Yokouchi | B62J 17/06 |
| | | | | 296/180.1 |
| 9,090,217 | B2* | 7/2015 | Atsuchi | H01M 50/20 |
| 9,765,731 | B2* | 9/2017 | Okubo | F02M 25/06 |
| 2005/0098596 | A1 | 5/2005 | Yano et al. | |
| 2010/0163328 | A1 | 7/2010 | Hasegawa | |
| 2010/0224172 | A1 | 9/2010 | Kusa | |
| 2010/0243354 | A1* | 9/2010 | Inaoka | F02M 37/0076 |
| | | | | 180/69.4 |
| 2011/0308874 | A1* | 12/2011 | Tanaka | B60K 15/03504 |
| | | | | 180/219 |
| 2012/0193164 | A1* | 8/2012 | Nagura | B62J 37/00 |
| | | | | 180/291 |
| 2013/0247881 | A1 | 9/2013 | Okubo et al. | |

FOREIGN PATENT DOCUMENTS

| | | |
|---|---|---|
| CN | 103029780 A | 4/2013 |
| CN | 103963885 A | 8/2014 |
| EP | 2 765 069 A1 | 8/2014 |
| GB | 2529531 A | 2/2016 |
| JP | 10-203456 A | 8/1998 |
| JP | 2001-310784 A | 11/2001 |
| JP | 2005-112310 A | 4/2005 |
| JP | 2010-155506 A | 7/2010 |
| JP | 2010-203313 A | 9/2010 |
| JP | 4861446 B2 | 11/2011 |
| JP | 2013-193626 A | 9/2013 |

OTHER PUBLICATIONS

Indian Office Action for Indian Application No. 201917040952, dated Dec. 31, 2020, with an English translation.

Extended European Search Report for European Application No. 18766816.5, dated Jan. 30, 2020.

\* cited by examiner

SADDLE-RIDING TYPE VEHICLE

TECHNICAL FIELD

The present invention relates to a saddle-riding type vehicle having a water-cooled internal combustion engine, a radiator and a fuel tank supported on a vehicle body frame.

BACKGROUND ART

A saddle-riding type vehicle in which in order to avoid the effect of the heat generated in an internal combustion engine a canister is disposed in front, in the vehicle fore-and-aft direction, of the internal combustion engine and in order to avoid the heat of a radiator reaching the canister it is disposed at a position where a fuel tank is sandwiched between the canister and the radiator is known from Patent Document 1.

RELATED ART DOCUMENTS

Patent Documents

Patent Document 1: Japanese Patent Application Laid-open No. 2010-155506

SUMMARY OF THE INVENTION

Problems to be Solved by the Invention

However, in the arrangement disclosed by Patent Document 1 above, since the canister is disposed to the rear of the fuel tank it is difficult for air flow to impinge on the canister, and the effect in cooling the canister is far from excellent.

The present invention has been accomplished in light of such circumstances, and it is an object thereof to provide a saddle-riding type vehicle that can enhance the effect in cooling a canister.

Means for Solving the Problems

In order to attain the above object, according to a first aspect of the present invention, there is provided a saddle-riding type vehicle in which a water-cooled internal combustion engine, a radiator and a fuel tank are supported on a vehicle body frame, characterized in that a canister that collects fuel vaporized within the fuel tank is disposed in front of the radiator in a vehicle fore-and-aft direction when viewed from a side.

Further, according to a second aspect of the present invention, in addition to the first aspect, the canister, which has a cylindrical external shape, is disposed so that a central axis thereof is along the vehicle fore-and-aft direction.

According to a third aspect of the present invention, in addition to the first or second aspect, the internal combustion engine is disposed to a rear of the radiator in the vehicle fore-and-aft direction when viewed from the side.

According to a fourth aspect of the present invention, in addition to any one of the first to third aspects, the fuel tank is disposed in front of the radiator in the vehicle fore-and-aft direction when viewed from the side, and the canister is disposed on one side, in a vehicle width direction, of the fuel tank.

According to a fifth aspect of the present invention, in addition to any one of the first to fourth aspects, one of a pair of side cowls, which are part of a vehicle body cover, is disposed so as to sandwich the canister between the one of the side cowls and the fuel tank in the vehicle width direction.

According to a sixth aspect of the present invention, in addition to any one of the first to fifth aspects, a louver comprising a plurality of vane portions inclined downward to a rear toward a direction of the canister and a slit disposed beneath the vane portions is provided on a front cover disposed in front of the canister in the vehicle fore-and-aft direction when viewed from the side.

According to a seventh aspect of the present invention, in addition to any one of the first to sixth aspects, the radiator is supported on the vehicle body frame in an attitude in which the radiator is inclined upward to a front so that a front face thereof faces the canister side.

According to an eighth aspect of the present invention, in addition to any one of the first to seventh aspects, the vehicle body frame has a head pipe steerably supporting handlebars, a down frame extending downward from the head pipe, and a pair of left and right lower frames connectedly provided on a lower part of the down frame and extending to the rear, the canister is supported on one of a pair of left and right support frames supporting from below a pair of left and right footrest parts formed on the vehicle body cover in order for a rider to place his or her feet on, and the canister is disposed above the lower frame when viewed from the side and on an inside of the one support frame in the vehicle width direction.

Effects of the Invention

In accordance with the first aspect of the present invention, since the canister is present in front of the radiator when viewed from the side, it is possible, by preventing heat from the radiator from affecting the canister when the vehicle is traveling, to enhance the effect in cooling the canister.

Furthermore, in accordance with the second aspect of the present invention, since the central axis of the canister, which has a cylindrical external shape, is along the vehicle fore-and-aft direction, it is possible to avoid any increase in the dimension in the vehicle width direction of the saddle-riding type vehicle, thus enabling the canister to be compactly disposed.

In accordance with the third aspect of the present invention, since the internal combustion engine is present to the rear of the radiator when viewed from the side, it is possible, by preventing heat from the internal combustion engine from affecting the canister, to further enhance the effect in cooling the canister.

In accordance with the fourth aspect of the present invention, since the canister is disposed on one side of the fuel tank, which is present in front of the radiator, the side wall of the fuel tank functions as an air flow guide plate, air flow is easily gathered around the canister, and the ease of cooling the canister improves.

In accordance with the fifth aspect of the present invention, the canister is present between the fuel tank and the side cowl, air that has been sucked in by a radiator fan of the radiator flows around the canister, and the ease of cooling the canister improves.

In accordance with the sixth aspect of the present invention, it becomes easy to make the air flow impinge on the canister by means of the louver formed on the front cover in front of the canister, and the ease of cooling the canister improves.

In accordance with the seventh aspect of the present invention, since the radiator is inclined upward to the front so that the front face faces the canister side, it is possible to make the air flow sucked in by the radiator fan pass around the canister without stagnating, thus further improving the ease of cooling the canister.

In accordance with the eighth aspect of the present invention, since the canister is supported on the support frame supporting from below the footrest part so as to be disposed above the lower frame when viewed from the side and on the inside of the support frame in the vehicle width direction, it is possible to eliminate the necessity for a frame exclusively used for supporting the canister, thus making the structure for supporting the canister compact while avoiding any increase in the number of components.

EXPLANATION OF REFERENCE NUMERALS AND SYMBOLS

Figure 1:
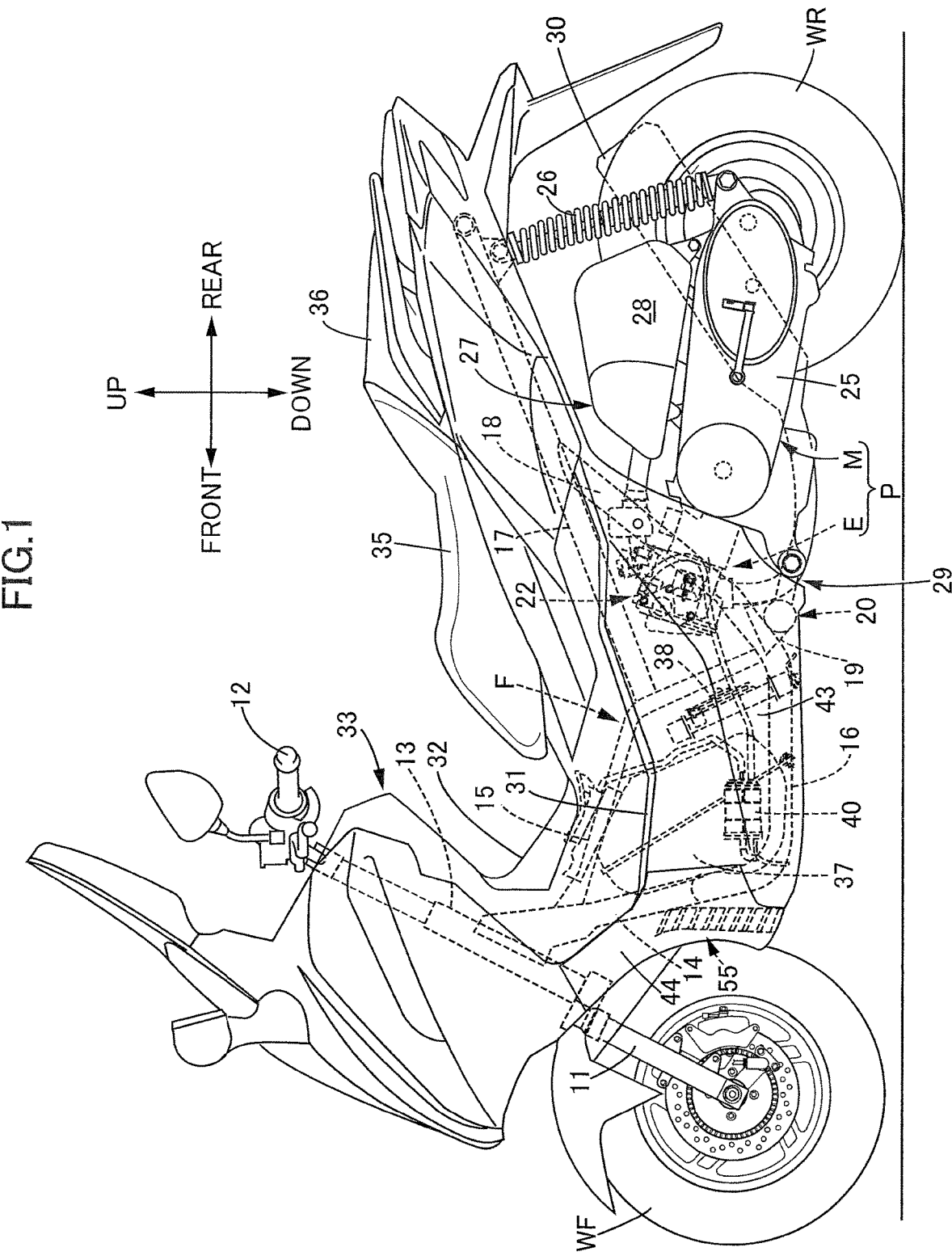
FIG. 1 is a left side view of a two-wheeled motor vehicle. (first embodiment)

12 Handlebars
13 Head pipe
14 Down frame
16 Lower frame
31 Footrest part
33 Vehicle body cover
37 Fuel tank
38 Radiator
38a Front face of radiator
40 Canister
43 Side cowl
44 Front cover
44a, 44b Vane portion
45 Support frame
55, 56 Louver
57, 58 Slit
C Central axis of canister
E Internal combustion engine
F Vehicle body frame

MODES FOR CARRYING OUT THE INVENTION

An embodiment of the present invention is explained by reference to attached FIG. 1 to FIG. 5. In the explanation below, up-and-down, left-and-right, and fore-and-aft mean directions as viewed by a person riding a two-wheeled motor vehicle.

First Embodiment

First, in FIG. 1, a vehicle body frame F of a scooter type two-wheeled motor vehicle, which is a saddle-riding type vehicle, includes a head pipe 13 steerably supporting a front fork 11 axially supporting a front wheel WF and handlebars 12 linked to the front fork 11, a down frame 14 extending downward from the head pipe 13, a pair of left and right main frames 15 branching to left and right from an upper part of the down frame 14 and extending downward to the rear, a pair of left and right lower frames 16 connectedly provided on a lower part of the down frame 14, extending rearward, and having their rear end parts connectedly provided on a lower end part of the main frame 15, a pair of left and right seat frames 17 connectedly provided on an intermediate part of the main frame 15 and extending upward to the rear, and a pair of left and right rear frames 18 providing a link between the rear end part of the lower frame 16 and the seat frame 17 and extending upward to the rear, the lower frame 16 and the rear frame 18 being molded as a unit.

A power unit P exerting power for driving a rear wheel WR is vertically swingably supported, via a link mechanism 20, on a bracket 19 provided on a front end part of the rear frame 18 of the vehicle body frame F. The power unit P is formed from a water-cooled internal combustion engine E disposed in front of the rear wheel WR and a transmission device M transmitting the output of the internal combustion engine E to the rear wheel WR. The transmission device M is connectedly provided on an engine main body 22 of the internal combustion engine E and housed within a transmission case 25 extending on the left side of the rear wheel WR, and a rear cushion unit 26 is provided between a rear part of the transmission case 25 and a rear part of the vehicle body frame F.

The engine main body 22 of the internal combustion engine E is in an attitude in which it is inclined forward so as to be substantially horizontal. An air intake system 27 having at the upstream end an air cleaner 28 supported on the transmission case 25 of the power unit P and disposed above the transmission case 25 is connected to a side wall of an upper part of a cylinder head forming part of the engine main body 22. An exhaust system 29 having at the downstream end an exhaust muffler 30 disposed on the right-hand side of the rear wheel WR is connected to a side wall of a lower part of the cylinder head.

Part of the power unit P and the vehicle body frame F are covered by a vehicle body cover 33 having a pair of left and right footrest parts 31 for a rider to place his or her feet on and a floor tunnel part 32 bulging upward between the footrest parts 31, the vehicle body cover 33 being mounted on the vehicle body frame F. A rider's seat 35 and a passenger seat 36 disposed to the rear of the rider's seat 35 are disposed to the rear of the floor tunnel part 32 and above the vehicle body cover 33.

Figure 2:
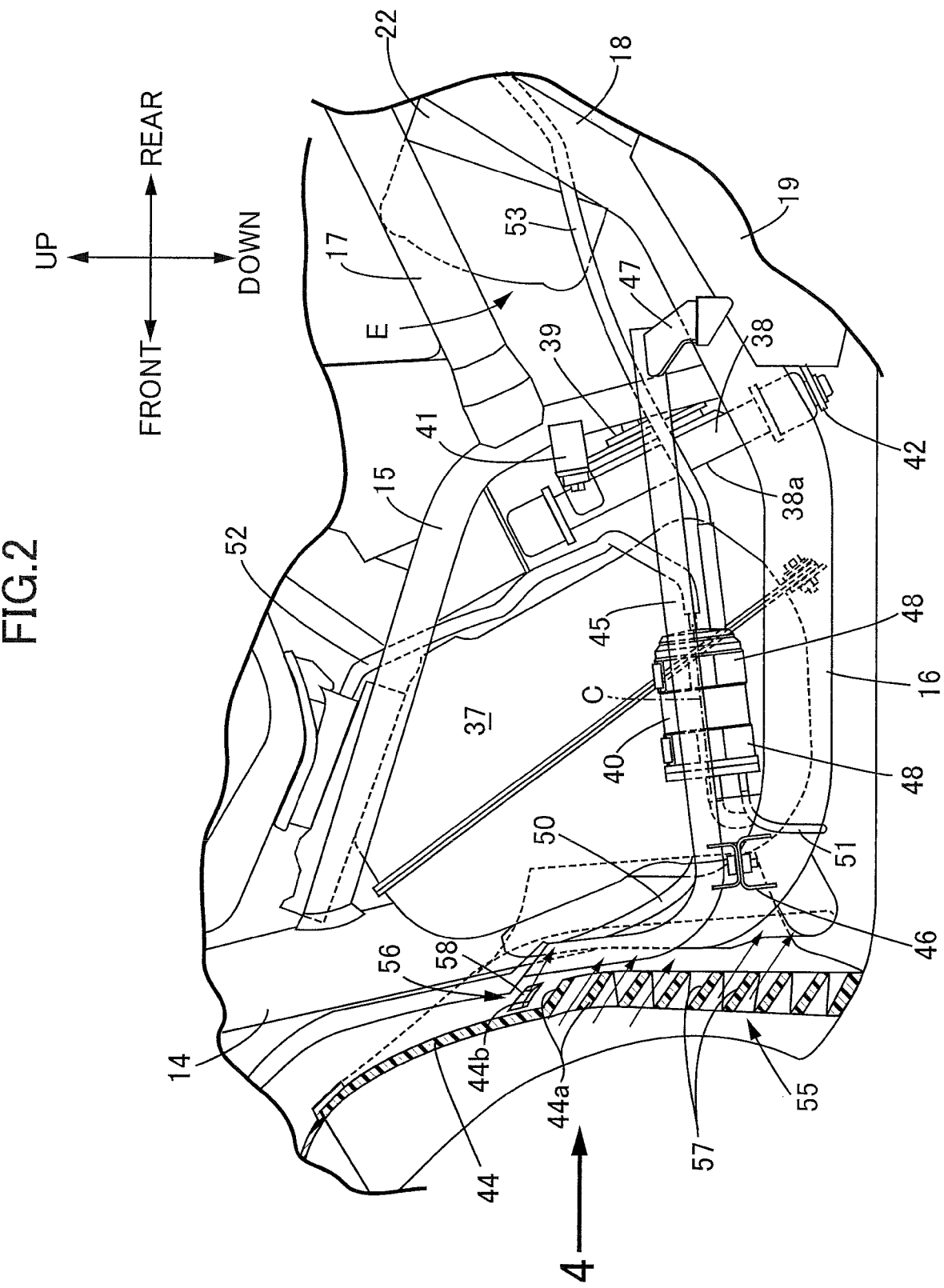
FIG. 2 is a longitudinal sectional side view showing the vicinity of a fuel tank in a state in which a side cowl is removed. (first embodiment)
Figure 3:
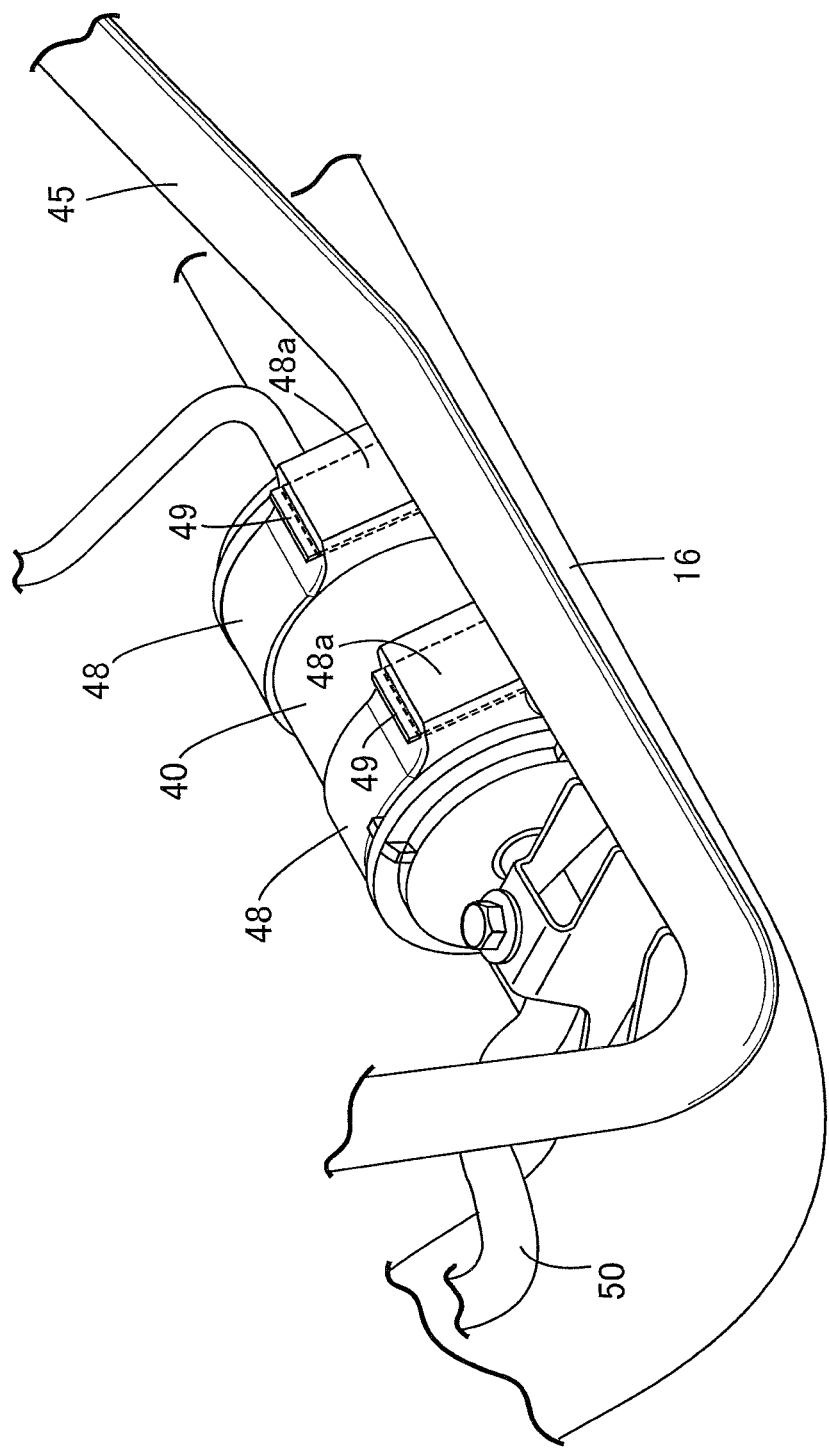
FIG. 3 is a perspective view of the vicinity of a canister. (first embodiment)

Referring in addition to FIG. 2, a fuel tank 37 is disposed in front of the power unit P so that it is supported by the down frame 14 and the lower frame 16 of the vehicle body frame F. A radiator 38 is disposed between the fuel tank 37 and the power unit P when viewed from the side, and a canister 40 collecting fuel vaporized within the fuel tank 37 is disposed in front of the radiator 38 in the vehicle fore-and-aft direction when viewed from the side. That is, the canister 40 is disposed in front of the radiator 38 in the vehicle fore-and-aft direction when viewed from the side, the internal combustion engine E of the power unit P is disposed to the rear of the radiator 38 in the vehicle fore-and-aft direction when viewed from the side, and the fuel tank 37 is disposed in front of the radiator 38 in the vehicle fore-and-aft direction when viewed from the side.

Moreover, the canister 40 is disposed on one side in the vehicle width direction of the fuel tank 37, in this embodiment on the left side of the fuel tank 37 in the vehicle width direction.

The radiator 38 includes a radiator fan 39 on a back face, has an attitude in which a front face 38a of the radiator 38 faces the canister 40, that is, an attitude in which it is inclined upward to the front, and is disposed between the fuel tank 37 and the internal combustion engine E of the power unit P in the vehicle fore-and-aft direction. An upper part of the radiator 38 is supported by a first stay 41 provided on a rear part of the main frame 15, and a lower part of the radiator 38 is supported by a second stay 42 provided on the bracket 19.

The footrest part 31 is formed on each of a pair of left and right side cowls 43 forming part of the vehicle body cover 33, and one of the side cowls 43 (in this embodiment the side cowl 43 on the left side in the vehicle width direction) is disposed so as to cover the canister 40 from the outside in the vehicle width direction. That is, the side cowl 43 on the left side in the vehicle width direction is disposed so as to sandwich the canister 40 between itself and the fuel tank 37 in the vehicle width direction.

The pair of left and right footrest parts 31 are each supported from below by a support frame 45, front parts of the support frames 45 in the vehicle fore-and-aft direction are supported by a support stay 46 provided on a front part of the lower frame 16, and rear parts of the support frames 45 in the vehicle fore-and-aft direction are supported by a support plate 47 provided on the front end part of the rear frame 18.

The canister 40 has a cylindrical external shape having opposite ends closed, and is disposed so that its central axis C is along the vehicle fore-and-aft direction. A band 48 made of a rubber is fitted at two locations spaced in the longitudinal direction of the canister 40 so as to be wound around the canister 40. A mounting plate 49 provided on the support frame 45 is inserted through a mounting projection portion 48a provided integrally with one position in the peripheral direction of the band 48, the support frame 45 thereby resiliently supporting the canister 40.

The canister 40 in a state in which it is supported by the support frame 45 is disposed above the lower frame 16 when viewed from the side and on the inside in the vehicle width direction of the support frame 45 on the left side in the vehicle width direction.

An air tube 50 and a drain tube 51 extend from a front end part in the vehicle fore-and-aft direction of the canister 40, the air tube 50 extending upward so as to open to the atmosphere and the drain tube 51 extending downward. A charge tube 52 and a purge tube 53 extend from a rear end part in the vehicle fore-and-aft direction of the canister 40, the charge tube 52 extending toward an upper part of the fuel tank 37 so as to guide vaporized fuel from the fuel tank 37 and the purge tube 53 extending rearward toward the air intake system 27 of the internal combustion engine E.

Figure 4:
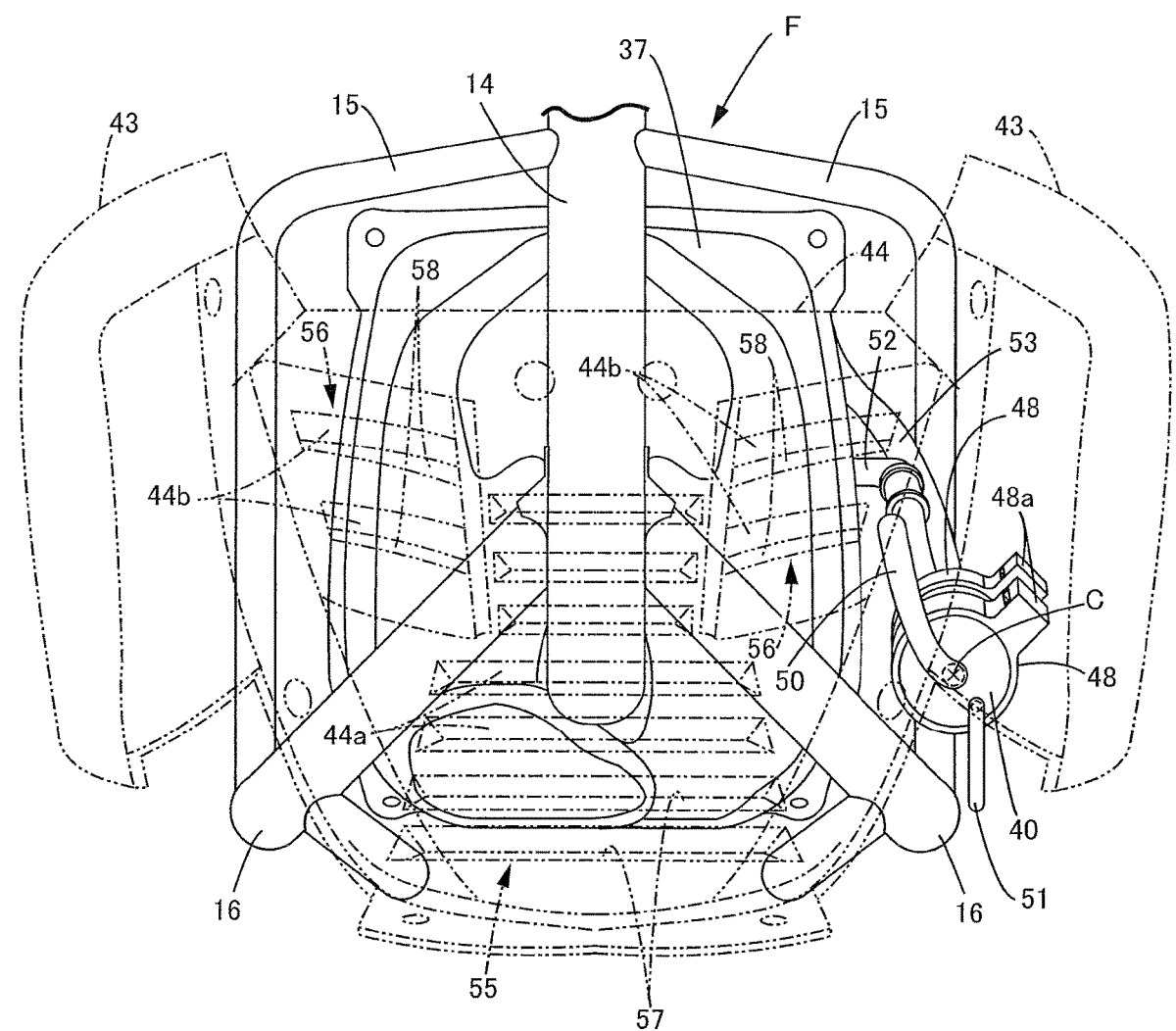
FIG. 4 is a front view from arrow 4 in FIG. 2 in a state in which a front cover is omitted. (first embodiment)
Figure 4:
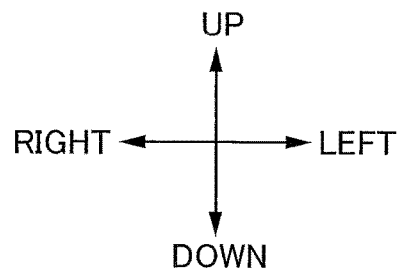
Figure 5:
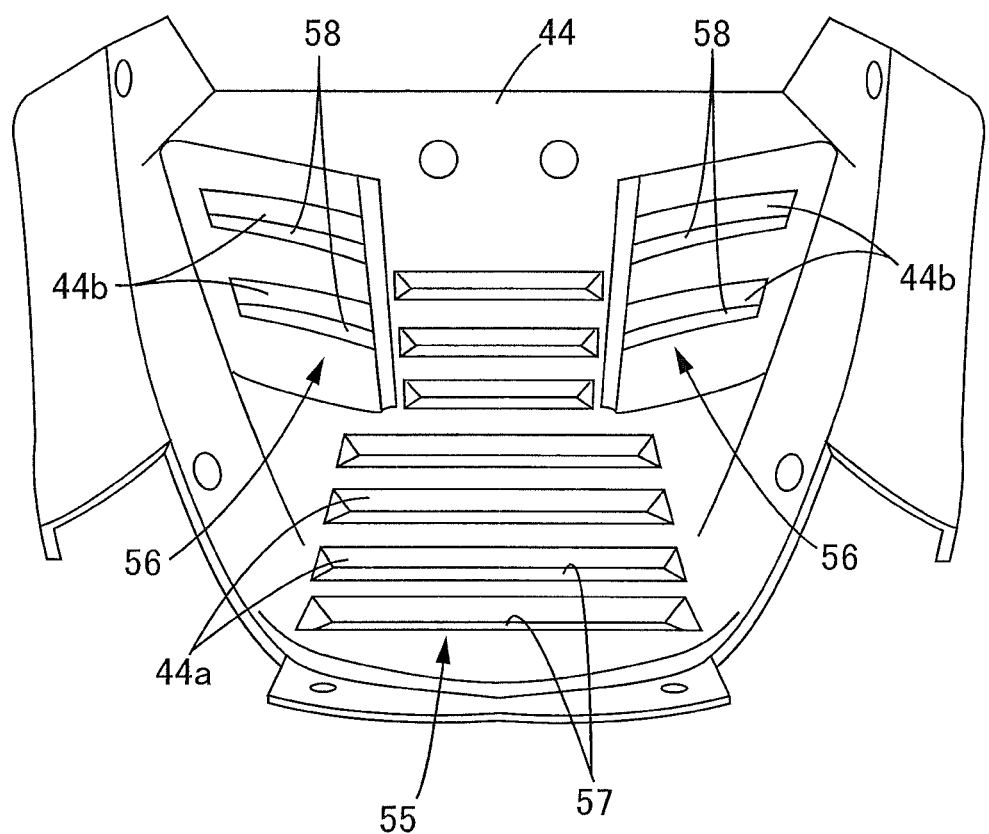
FIG. 5 is a front view of the front cover. (first embodiment)
Figure 5:
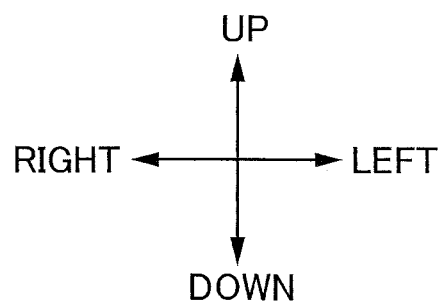

Referring in addition to FIG. 4 and FIG. 5, a front cover 44 forming part of the vehicle body cover 33 is disposed in front of the fuel tank 37 and the canister 40 in the vehicle fore-and-aft direction when viewed from the side. A first louver 55 is provided in a middle part in the vehicle width direction of the front cover 44, and a second louver 56 is respectively provided on upper parts on opposite sides in the vehicle width direction of the front cover 44.

The first louver 55 includes a plurality of vane portions 44a arranged in the vertical direction while being inclined downward to the rear and connectedly provided integrally with the front cover 44, and a slit 57 formed in the front cover 44 so as to be disposed beneath the vane portion 44a. The second louver 56 includes a plurality of vane portions 44b arranged in an up-and-down direction while being inclined downward to the rear and connectedly provided integrally with the front cover 44, and a slit 58 formed in the front cover 44 so as to be disposed beneath the vane portion 44b.

Due to the vane portion 44a of the first louver 55 being inclined downward to the rear, air flow can be made to pass toward the canister 40, and among the pair of left and right second louvers 56 the vane portion 44b of the second louver 56 on the left side in the vehicle width direction is inclined downward to the rear toward the canister 40 side.

The operation of the embodiment is now explained. Since the canister 40, which collects fuel vaporized within the fuel tank 37, is disposed in front of the radiator 38 in the vehicle fore-and-aft direction when viewed from the side, it is possible, by preventing heat from the radiator 38 from affecting the canister 40 when the two-wheeled motor vehicle is traveling, to enhance the effect in cooling the canister 40.

Furthermore, since the canister 40, which has a cylindrical external shape, is disposed so that its central axis C is along the vehicle fore-and-aft direction, it is possible to avoid any increase in the dimension in the vehicle width direction of the two-wheeled motor vehicle, thus enabling the canister 40 to be compactly disposed.

Moreover, since the internal combustion engine E is disposed to the rear of the radiator 38 in the vehicle fore-and-aft direction when viewed from the side, it is possible, by preventing heat from the internal combustion engine E from affecting the canister 40, to further enhance the effect in cooling the canister 40.

Furthermore, since the fuel tank 37 is disposed in front of the radiator 38 in the vehicle fore-and-aft direction when viewed from the side, and the canister 40 is disposed on one side in the vehicle width direction of the fuel tank 37 (in this embodiment on the left side), the side wall of the fuel tank 37 functions as an air flow guide plate, air flow is easily gathered around the canister 40, and the ease of cooling the canister 40 improves.

Moreover, since the side cowl 43 on the left side in the vehicle width direction is disposed so as to sandwich the canister 40 between itself and the fuel tank 37 in the vehicle width direction, the canister 40 is present between the fuel tank 37 and the side cowl 43, air that has been sucked in by the radiator fan 39 of the radiator 38 flows around the canister 40, and the ease of cooling the canister 40 improves.

Furthermore, since the first louver 55, which includes the plurality of vane portions 44a inclined downward to the rear toward the direction of the canister 40 and the slit 57 disposed beneath the vane portion 44a, is provided on a middle part in the vehicle width direction of the front cover 44 disposed in front of the canister 40 in the vehicle fore-and-aft direction when viewed from the side, and the second louver 56, which includes the plurality of vane portions 44b inclined downward to the rear toward the direction of the canister 40 and the slit 58 disposed beneath the vane portion 44b, is provided on an upper part on the left side in the vehicle width direction of the front cover 44, it becomes easy to make the air flow impinge on the canister 40, and the ease of cooling the canister 40 improves.

Moreover, since the radiator 38 is supported on the vehicle body frame F in an attitude in which it is inclined upward to the front so that the front face 38a faces the canister 40 side, it is possible to make the air flow sucked in by the radiator fan 39 pass around the canister 40 without stagnating, thus further improving the ease of cooling the canister 40.

Furthermore, since the canister 40 is supported on one of the pair of left and right support frames 45 (in this embodiment the support frame 45 on the left in the vehicle width direction) supporting from below the pair of left and right footrest parts 31 formed on the vehicle body cover 33, and the canister 40 is disposed above the lower frame 16 when viewed from the side and on the inside of the one support frame 45 in the vehicle width direction, it is possible to eliminate the necessity for a frame exclusively used for supporting the canister 40, thus making the structure for supporting the canister 40 compact while avoiding any increase in the number of components.

An embodiment of the present invention is explained above, but the present invention is not limited to the above embodiment and can be modified in a variety of ways as long as the modifications do not depart from the spirit and scope thereof.

For example, the present invention may be applied not only to a two-wheeled motor vehicle but also widely to saddle-riding type vehicles, including a three-wheeled motor vehicle.

The invention claimed is:

1. A saddle-riding vehicle in which a water-cooled internal combustion engine, a radiator and a fuel tank are supported on a vehicle body frame,
    wherein a canister that collects fuel vaporized within the fuel tank is disposed in front of the radiator in a vehicle fore-and-aft direction and within a vertical height of the radiator in a vertical direction when viewed from a side, and the radiator is supported on the vehicle body frame in an attitude in which the radiator is inclined upward to a front so that a front face thereof faces the canister side,
    wherein the fuel tank is disposed in front of the radiator in the vehicle fore-and-aft direction when viewed from a side, and the canister is disposed on one side, in a vehicle width direction, of the fuel tank and within a width of the fuel tank in the vehicle fore-and-aft direction when viewed from the side.

2. The saddle-riding vehicle according to claim 1, wherein the canister, which has a cylindrical external shape, is disposed so that a central axis thereof is along the vehicle fore-and-aft direction.

3. The saddle-riding vehicle according to claim 1, wherein the internal combustion engine is disposed to a rear of the radiator in the vehicle fore-and-aft direction when viewed from the side.

4. The saddle-riding vehicle according to claim 1, wherein one of a pair of side cowls, which are part of a vehicle body cover, is disposed so as to sandwich the canister between the one of the side cowls and the fuel tank in the vehicle width direction.

5. The saddle-riding vehicle according to claim 1, wherein a louver comprising a plurality of vane portions inclined downward to a rear toward a direction of the canister and a slit disposed beneath the vane portions is provided on a front cover disposed in front of the canister in the vehicle fore-and-aft direction when viewed from the side.

6. The saddle-riding vehicle according to claim 1, wherein the vehicle body frame has a head pipe steerably supporting handlebars, a down frame extending downward from the head pipe, and a pair of left and right lower frames connectedly provided on a lower part of the down frame and extending to the rear, the canister is supported on one of a pair of left and right support frames supporting from below a pair of left and right footrest parts formed on the vehicle body cover in order for a rider to place his or her feet on, and the canister is disposed above the lower frame when viewed from the side and on an inside of said one support frame in the vehicle width direction.

* * * * *